United States Patent
Thigpen et al.

(10) Patent No.: US 11,188,349 B2
(45) Date of Patent: Nov. 30, 2021

(54) PLATFORM-BASED ENTERPRISE TECHNOLOGY SERVICE PORTFOLIO MANAGEMENT

(71) Applicant: ServiceNow, Inc., Santa Clara, CA (US)

(72) Inventors: David Thigpen, Boise, ID (US); Caitlin Anne Markham, La Jolla, CA (US); John Alan Botica, Escondido, CA (US); Andrew McDonald, San Diego, CA (US); Jason Douglas Aloia, Carlsbad, CA (US); Anthony Michael Arobone, San Deigo, CA (US)

(73) Assignee: ServiceNow, Inc., Santa Clara, CA (US)

( * ) Notice: Subject to any disclaimer, the term of this patent is extended or adjusted under 35 U.S.C. 154(b) by 216 days.

(21) Appl. No.: 16/402,817

(22) Filed: May 3, 2019

(65) Prior Publication Data

US 2020/0348947 A1  Nov. 5, 2020

(51) Int. Cl.
| | |
|---|---|
| *G06F 9/445* | (2018.01) |
| *G06F 11/30* | (2006.01) |
| *G06F 11/34* | (2006.01) |
| *G06F 9/54* | (2006.01) |

(52) U.S. Cl.
CPC .......... *G06F 9/44505* (2013.01); *G06F 9/542* (2013.01); *G06F 11/302* (2013.01); *G06F 11/3409* (2013.01)

(58) Field of Classification Search
CPC ..... G06F 9/542; G06F 11/302; G06F 11/3409
See application file for complete search history.

(56) References Cited

U.S. PATENT DOCUMENTS

| | | | |
|---|---|---|---|
| 6,321,229 B1 | 11/2001 | Goldman |
| 6,678,887 B1 | 1/2004 | Hallman |
| 7,020,706 B2 | 3/2006 | Cates |
| 7,716,353 B2 | 5/2010 | Golovinsky |
| 7,769,718 B2 | 8/2010 | Murley |
| 7,890,802 B2 | 2/2011 | Gerber |
| 7,925,981 B2 | 4/2011 | Pourheidari |
| 8,151,261 B2 | 4/2012 | Sirota |
| 8,224,683 B2 | 7/2012 | Manos |
| 8,402,127 B2 | 3/2013 | Solin |
| 8,612,408 B2 | 12/2013 | Non |
| 8,646,093 B2 | 2/2014 | Myers |
| 8,832,652 B2 | 9/2014 | Mueller |

(Continued)

*Primary Examiner* — Raymond N Phan
(74) *Attorney, Agent, or Firm* — Fletcher Yoder PC

(57) ABSTRACT

Techniques related to hosted client management comprising providing a hosted client instance over a network interface for communicatively coupling with a remote client device, the hosted client instance including a first application component for performing a first plurality of actions associated with the hosted client instance and a second application component for performing a second plurality of actions, monitoring, by the first application component, the second application component for an event associated with the second application component, determining that the event impacts the first application component based on one or more dependency tables associated with the second application component, and displaying, in a user interface of the first application component, information related to the event.

20 Claims, 9 Drawing Sheets

(56) References Cited

U.S. PATENT DOCUMENTS

| | | |
|---|---|---|
| 8,983,982 B2 | 3/2015 | Rangarajan |
| 9,065,783 B2 | 6/2015 | Ding |
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 2002/0188430 A1* | 12/2002 | Benny ................ G06Q 10/0631 703/7 |
| 2005/0081079 A1* | 4/2005 | Cheston ............. G06F 11/0748 714/2 |
| 2005/0081118 A1* | 4/2005 | Cheston ............. G06F 11/0784 714/47.1 |
| 2006/0248407 A1* | 11/2006 | Adams, Jr. .......... H04L 41/0253 714/43 |
| 2008/0021918 A1* | 1/2008 | Rao ....................... G06F 16/958 |
| 2012/0136957 A1* | 5/2012 | Bellamy, III ...... G06Q 20/3276 709/208 |
| 2013/0086140 A1* | 4/2013 | Salsburg ................ G06F 9/541 709/203 |

* cited by examiner

PLATFORM-BASED ENTERPRISE TECHNOLOGY SERVICE PORTFOLIO MANAGEMENT

TECHNICAL FIELD

Embodiments described herein generally relate to enterprise service (ES) management, and more particularly, to providing access to ES and ESs offering information within an application and access to relevant event information across applications.

BACKGROUND

A variety of enterprise and/or information technology (IT) related software applications may be utilized to support various functions of an enterprise such as Finance, Human Resource (HR), IT, Legal, Marketing, Sales, and the like. The software applications may be deployed on an instance platform on a server and accessed as needed over a network such as a Local Area Network (LAN) or the Internet. The server may be a local enterprise server as part of a self-hosted system or a remote server located in the Cloud as part of a cloud computing system.

Cloud computing relates to sharing of computing resources that are generally accessed via the Internet. In particular, cloud computing infrastructure allows users to access a shared pool of computing resources, such as servers, storage devices, networks, applications, and/or other computing-based ESs. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or IT related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes providing a hosted client instance over a network interface for communicatively coupling with a remote client device, the hosted client instance including a first application component for performing a first plurality of actions associated with the hosted client instance and a second application component for performing a second plurality of actions, monitoring, by the first application component, the second application component for an event associated with the second application component, determining that the event impacts the first application component based on one or more dependency tables associated with the second application component, and displaying, in a user interface of the first application component, information related to the event.

In another embodiment, the method may be embodied in computer executable program code and stored in a non-transitory storage device. In yet another embodiment, the method may be implemented on a (cloud-based or self-hosted) computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
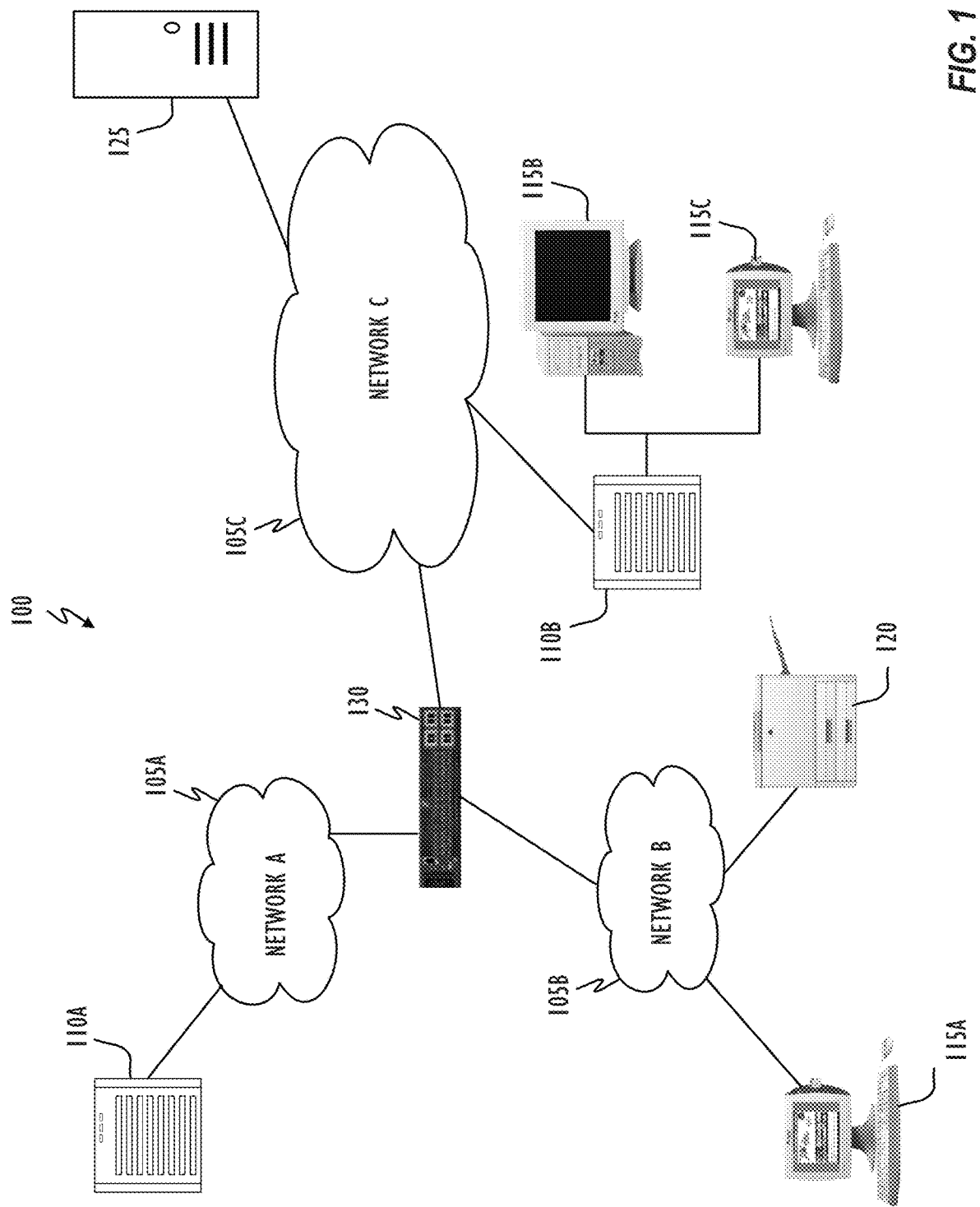
FIG. 1 illustrates a block diagram of self-hosted network system 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other embodiments, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine hosted on one of more physical devices, virtual container hosted on one or more physical devices, host, server, laptop, tablet, and/or mobile device or to a plurality of electronic computing devices working together to perform the function described as being performed on or by the computing system.

As used herein, the term "medium" or "memory" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system or one or more hardware processors. Example embodiments of an application include software modules, software objects, software instances and/or other types of executable code.

This disclosure relates to providing information related to the performance and health of ESs of a hosted client instance. More specifically, a hosted client interface may include multiple local applications, each with a set of related ESs. ESs associated with a local application may be divided into one or more ES portfolios. These ESs may include one or more ES configurations, which may also be referred to as offerings, which allow for multiple versions of the ES to be offered. Generally, one or more ES owners are responsible for each ES portfolio. As a given ES portfolio may include multiple ESs with potentially multiple ES configurations, obtaining insight as to the health and performance of the ES portfolio, individual ESs, and ES configurations may be challenging. In addition, as the ES owner is generally responsible for ES portfolio, the ES owner may want to know of items that may potentially impact their ES portfolio. These items may arise not only from within their ES portfolio, but from other ES portfolios or from separate local applications. For example, a configuration change made as a part of handling an event in a separate local application may require a reboot of a server which also hosts ESs associated with the ES owner's ES portfolio. Obtaining information related to items associated with separate local applications may be challenging as other local applications may be the responsibility of a separate ES owner. AN ES portfolio overview UI may be used to provide insights into the overall health and performance of the ES portfolio, drill down and provide insights to ES and ESs offering level health and performance metrics, as well as obtain and surface information related to items which may impact the ES portfolio.

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
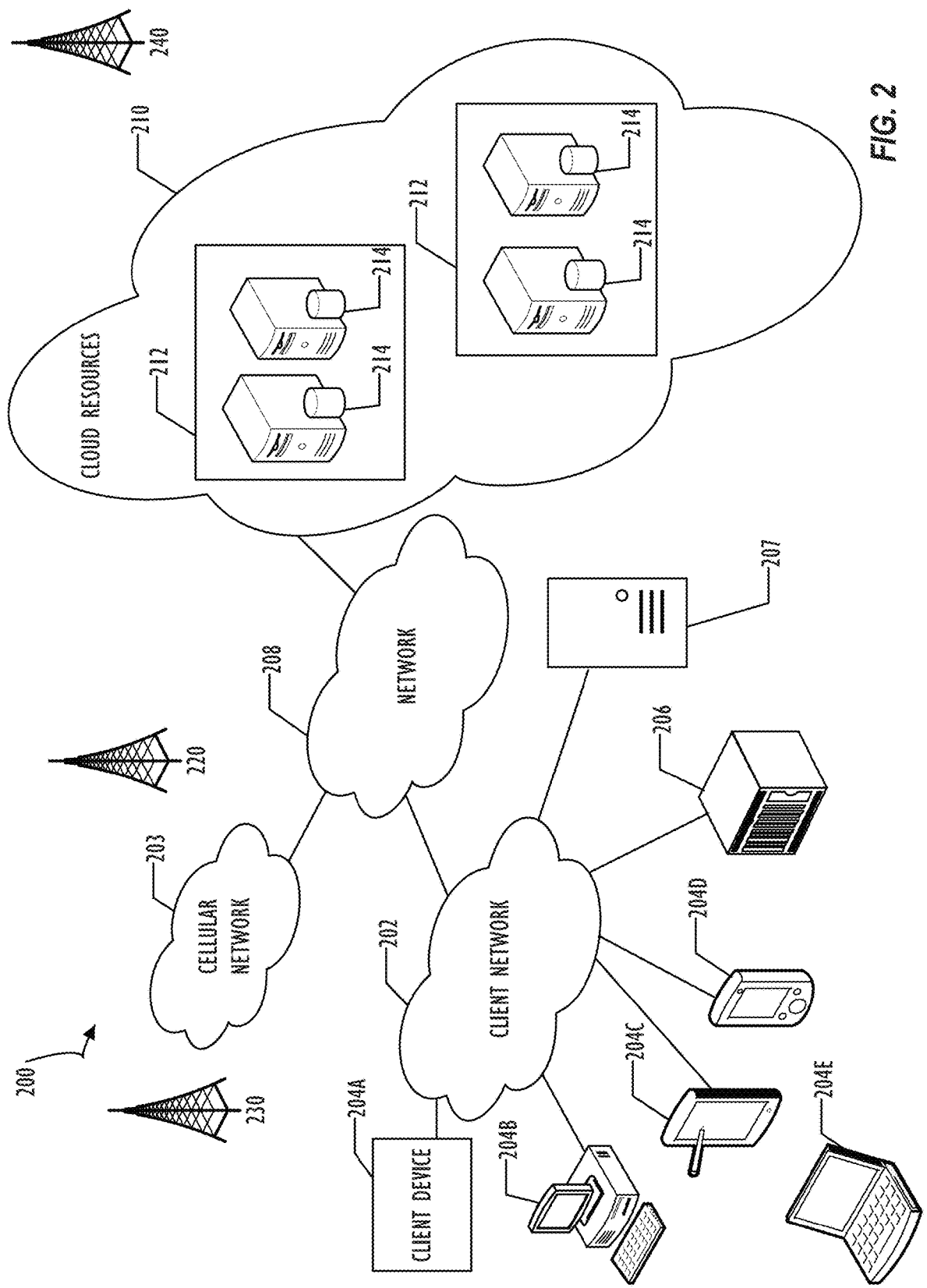
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and ESs, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
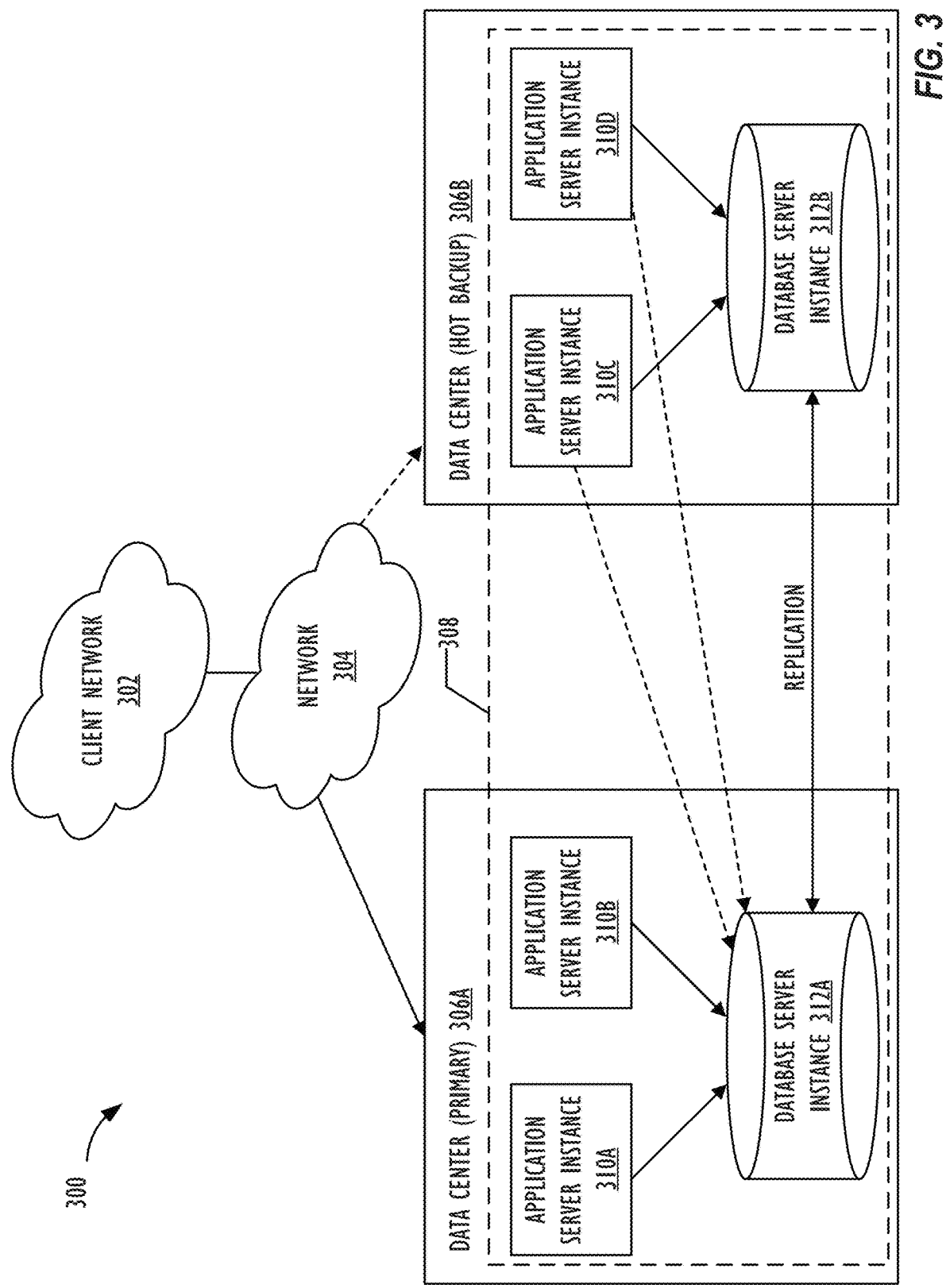
FIG. 3 illustrates a block diagram of multi-instance cloud architecture 300 where one or more embodiments of the present disclosure may operate.

In one embodiment, utilizing a multi-instance cloud architecture, a first client instance may be configured with a client side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate. FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B. Stated another way, the application server instances 310A-310D and database server instances 312A and 312B are not shared with other client instances 308. Other embodiments of multi-instance cloud architecture 300 could include other types of dedicated server instances, such as a web server instance. For example, client instance 308 could include the four dedicated application server instances 310A-310D, two dedicated database server instances 312A and 312B, and four dedicated web server instances (not shown in FIG. 3).

To facilitate higher availability of client instance 308, application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master MySQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For example, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into single server instance. The use and discussion of FIGS. 1-3 are only exemplary to facilitate ease of description and explanation.

Figure 4:
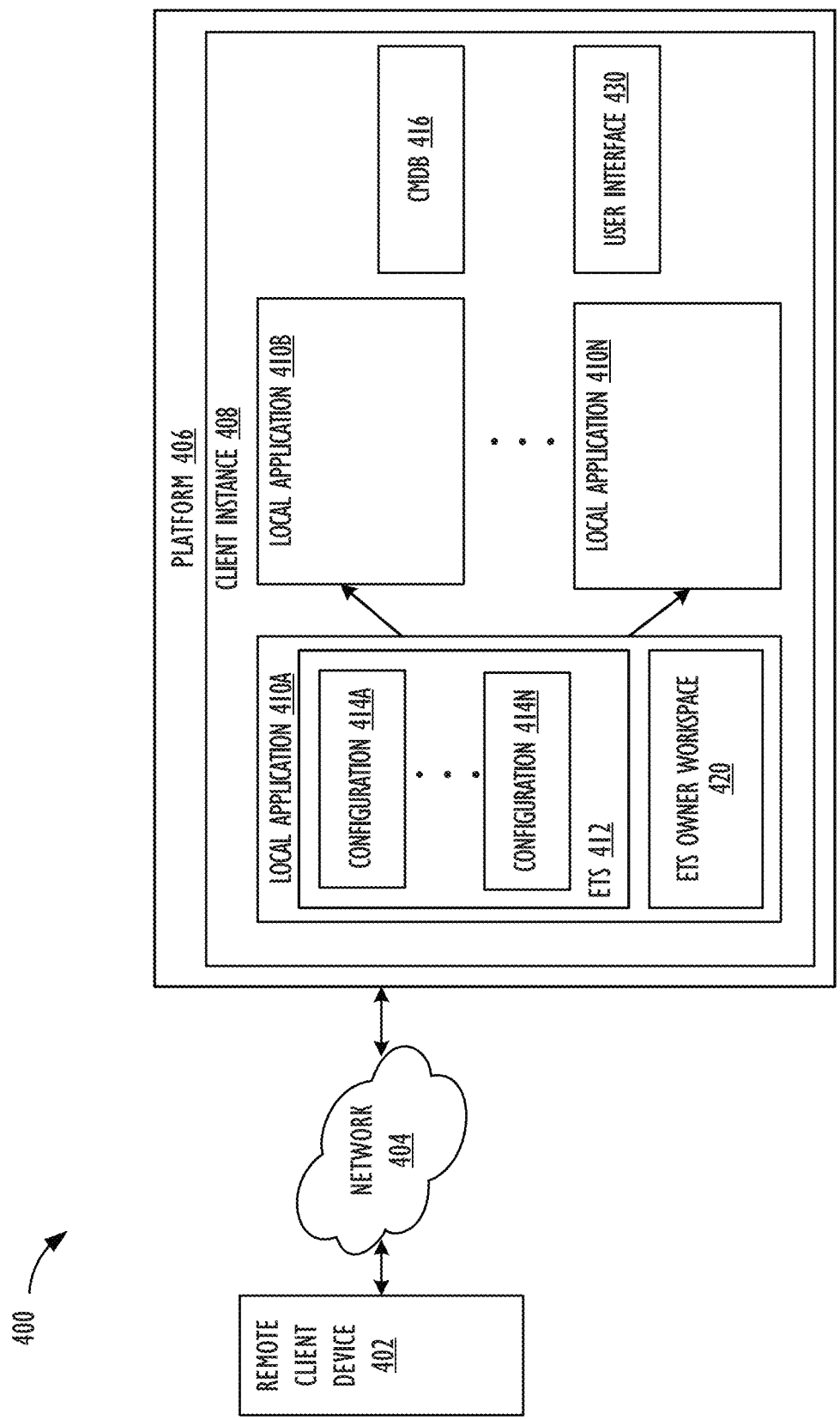
FIG. 4 illustrates a network infrastructure 400 where one or more embodiments of the present disclosure may operate.

FIG. 4 illustrates a block diagram of a network infrastructure 400 for providing a platform based ES portfolio management, according to one or more embodiments. As shown in FIG. 4, network infrastructure 400 may include remote client device 402 and platform 406 that are communicatively coupled to each other through network 404. Remote client device 402 may be substantially similar to any of client devices 104, as described in FIG. 1, or client devices 204 of FIG. 2. Network 404 may be substantially similar to any of client network 102 and network 108, as described in FIG. 1, or client network 202 and network 208 of FIG. 2. Detailed description of remote client device 402 and network 404 is omitted here. Platform 406 may be substantially similar to any of local compute resource 106 and server instance 114, as described in FIG. 1, and application server instances 310A-310D, database server instances 312A and 312B, as described in FIG. 2. That is, platform 406 may correspond to a cloud-based server of cloud computing infrastructure 200, as described in FIG. 2. Although the various components are described as located in particular locations and with particular functionality, in one or more embodiments, the various modules may be differently located. Further, the functionality may be differently distributed across the network infrastructure 400 or in different locations not shown.

Platform 406 may include a client instance 408. Client instance 408 may be substantially similar to client instance 308, as described in FIG. 3. Client instance 408 may art as a hosted client instance platform for deploying various enterprise and/or IT related software applications and related enterprise data on a live database. Client instance 408 may be hosted on any of data server computers 110, as described in FIG. 1, and cloud resources platform/network 210, as described in FIG. 2, and may be accessible by a user of remote client device 402 via network 404 through an application interface such as a graphical user interface (GUI) or a web browser executing on remote client device 402, in order to access software applications, ESs, and data deployed on client instance 408. Client instance 408 may include a user interface 430, such as an interface that allows a user to utilize one or more capabilities in areas of the enterprise such as IT, IT support, security, customer service, technical support, e-mail, backup and storage, HR, finance, legal, marketing, sales, compliance, and governance. For example, the software applications may include components related to the following applications and modules utilized by the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Enterprise Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

The various capabilities may be provided in the form of one or more local applications 410A, 410B . . . 410N (local to the client instance 408, and collectively 410) hosted by the client instance 408. Local applications 410 are a grouping of one or more forms, tables, rules, data, etc., used to manage and perform a type of work, which comprises a related set of functionality or capabilities. Local applications may provide specific user facing capabilities as well as backend type capabilities, such as for collecting and organizing software dependencies, understanding infrastructure configurations, and so forth. As an example, the configuration management database (CMDB) 416 may be a local application 410 that includes a data model related to servers, switches, other applications, users, etc., of an organization that may help track and understand how each component of the organization relates to and impacts other components.

As another example, an IT service management local application may include tables and forms which relate to collecting information and managing a set of servers, network hardware, and ESs. A local application 410A may include an ES 412. Although one ES 412 is shown, local applications 410 may include multiple ESs. ES 412 may also include the tables and forms for managing or controlling a specific enterprise need, such as such as email or virtual machines. ES 412 may include one or more ES configurations (414A . . . 414N, collectively 414), which are different versions of the enterprise service. Multiple ES configurations 414 allow the ES to be stratified, with certain ES configurations allowing for a higher cost tier of service, different support structures, different cost structures, different audiences, etc. For example, an organization may configure two ES configurations of an email ES, the first as a standard employee email ES with a set of support staff and the second as a locked-down or forwarded executive email ES with different set of support staff. Local applications 410 may also include an ES owner workspace 420. As described below with respect to FIG. 5, the ES owner workspace 420 obtains and displays information regarding the local application 410 that may be used to assess the health and performance of one or more portions of the local application 410.

Figure 5:
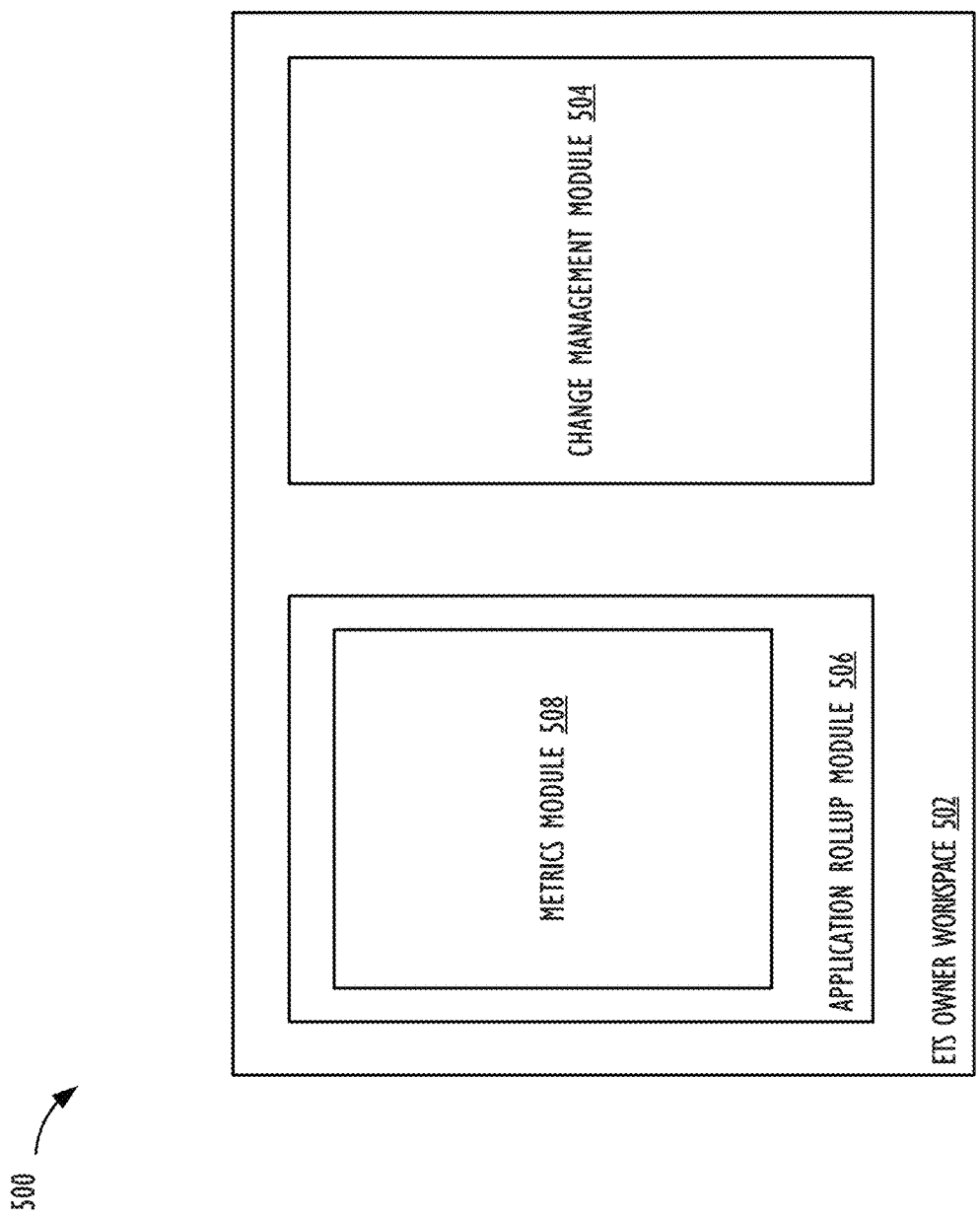
FIG. 5 is a block diagram of an ES owner workspace 500, in accordance with aspects of the present disclosure

FIG. 5 is a block diagram of an ES owner workspace 500, in accordance with aspects of the present disclosure. The ES owner workspace 502 includes an impact management module 504, along with an application rollup module 506 and a metrics module 508. The impact management module 504 of a local application extracts information regarding events from other local applications and determines if those events can potentially impact the ESs of the local application. For example, a change and release management (CRM) local application may help manage various tasks, such as change requests through the lifecycle of the change request. As a part of a change request, for example to reconfigure a server, the server may need to be rebooted. The change request may include a schedule for when the server is to be rebooted. However, that server may also host part of the email service. The email ES may be managed by the IT service management local application. The impact management module 504 may monitor the CRM local application for items, such as events, outages, incidents, etc. When an item is detected, the impact management module 504 may determine the expected impact of the item. Items may be associated with one or more dependencies which indicate what resources may be needed for or affected by the item, such as the hardware, people, connections, ESs, etc. In certain cases, this information may be maintained by the CMDB. For example, the impact management module 504 may obtain information from the item and lookup dependencies from the CMDB. The dependencies of the item may be checked as against the dependencies for the potentially impacted ES portfolio. Based on this check, a determination may be made, for example, that the server includes a portion of the email service. This information may then be displayed to the user via a user interface, such as an impact management user interface (UI). The impact management UI of a certain local application or ES portfolio displays information regarding items, across multiple local applications, that may impact the certain local application or ES portfolio. The impact management UI may be a separate UI or integrated into an ES portfolio UI 510. The ES portfolio UI 510 helps organize and present ES portfolio health and performance information to an ES owner. Generally, information related to a set of ESs may be grouped into the ES portfolio UI 510 to allow an ES owner to get on overview of the ESs they are responsible for.

The application rollup module 506 helps enable functionality around performance and metrics for ESs and ES configurations of a local application. In certain cases, it may be useful to divide the ESs of a local application into multiple ES portfolios, for example based on an organizational structure of an enterprise, geographic distribution, etc. The application rollup module 506 enables the bundling of a set of ESs and their associated ES configurations into ES portfolios. Generally, ESs offered by a local application may be grouped into one or more ES portfolios. These ES portfolios may be based on a predefined template, but may be customized by adding or removing ESs, layers, or custom defined hierarchies. As an example, ESs owned by a first ES owner for a local application can be grouped into a first ES portfolio. Other ESs of the local application may be grouped into a second ES portfolio owned by a second ES owner.

The metrics module 508 enables health and performance monitoring of ESs and features. In certain cases, the health and performance of an ESs offering of an ES may be evaluated based on a set of metrics calculated for the ES configuration. In certain cases, these metrics may include, but are not limited to the availability of the ES configuration, stability of the ES configuration, a level of activity of the ES configuration, performance against service level agreements (SLAs), and customer satisfaction ratings. In certain cases, availability of the ESs offering may be determined based on ESs offering outage records over a period of time. The stability of the ESs offering may be based on, for example, a combination of any major incidents and high priority incidents recorded over a period of time. As an example, the activity of the ESs offering provides metrics related to how frequently a particular ESs offering is being requested and delivered. Compliance with a SLA agreement for an ES configuration, for example, may be monitored by service level management modules (not shown) and performance against, and breeches of, the SLA agreement may be recorded. This information may be used to determine the SLA metrics. Customer satisfaction ratings may be based, for example, on satisfaction polling of users for a given ES configuration. Generally, metrics measured by the metrics module 508 may be selected based on a potential value a metric has for an organization, considering the costs associated with obtaining information needed to determine the metric and the potential benefits of the information. In certain cases, other metrics may be measured, including user-defined metrics.

Figure 6:
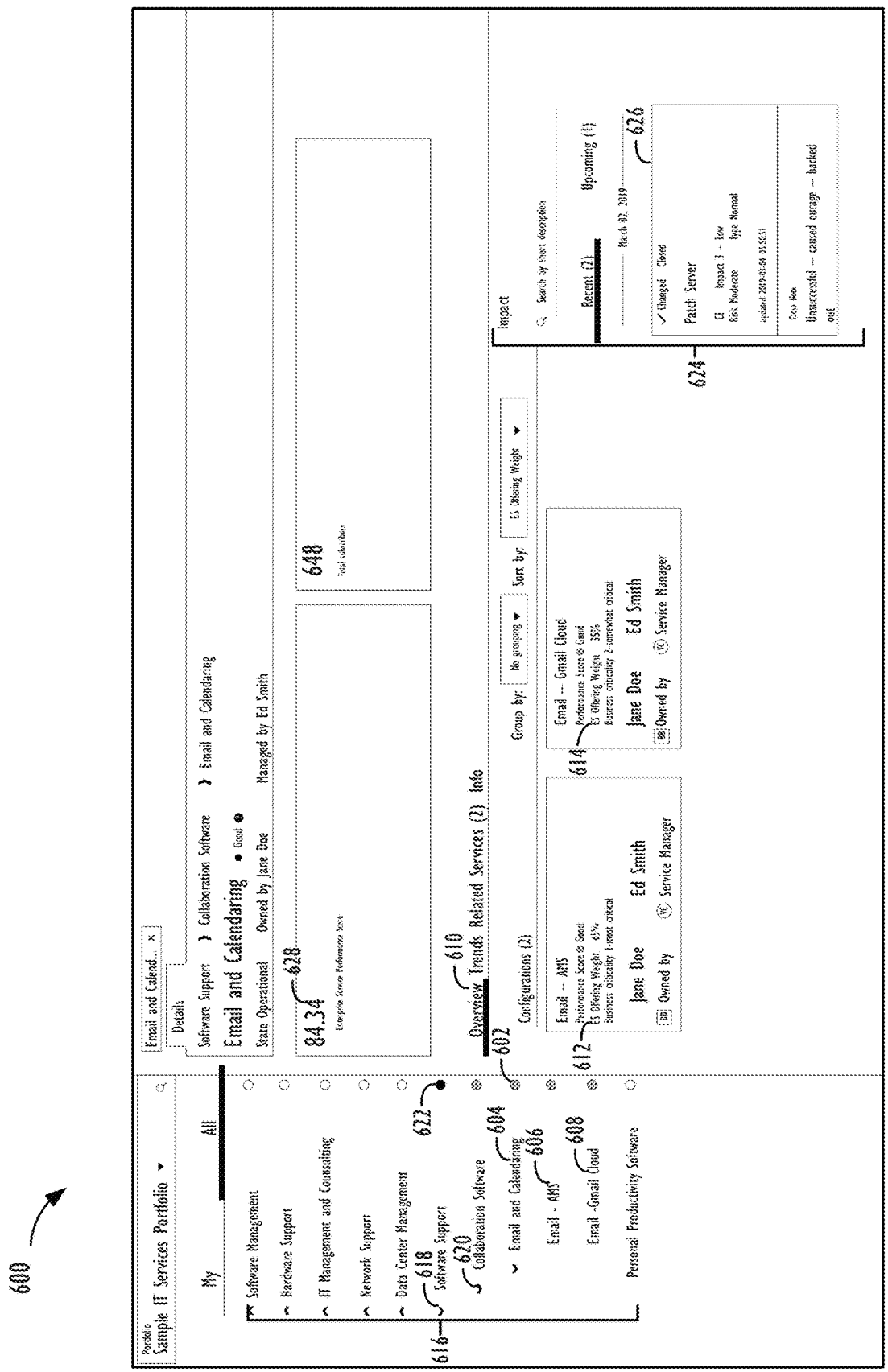
FIG. 6 illustrates a sample ES portfolio UI 600, in accordance with aspects of the present disclosure.

FIG. 6 illustrates a sample ES portfolio UI 600, in accordance with aspects of the present disclosure. The ES portfolio UI 600 includes an ES performance icon 602 which provides an indication of the health and performance of an ES. In certain cases, the ES performance icon 602 may be color coded based on an ES performance score 628 of the ES. The ES performance icon 602 may be displayed, for example, in the ES portfolio UI 600, such as in the ES portfolio structure 616. The ES performance score of the ES may be based on performance scores for ES configurations of the ES. For example, an email and calendaring ES 604 may include ES configurations such as a corporate email ESs offering 606 and a webmail ESs offering 608. As discussed above, various metrics may be calculated for an ESs offering based on, for example, availability, stability, activity level, SLA statistics and customer satisfaction. These metrics may be used to determine an ESs offering performance score. In certain cases, the ESs offering performance score may be an average of the values for the various metrics. In other cases, a weight may be assigned to a value for one or more metrics. This weight may be the same for each metric, or may vary based on the metric. In certain cases, the weight of each metric may be pre-determined. In other cases, the weights associated with the metrics may be modified, for example, by an administrator or user, or dynamically determined algorithmically. In certain cases, the weights of the metrics sum up to a certain value, such as 100, and each metric may be multiplied against the associated weight and summed together. In certain cases, each metric may be weighted together and summed to determine the ESs offering performance score of the ES. This ESs offering performance score may be indicated in various parts of the ES portfolio UI 600. As an example, the ESs offering performance score for the corporate email ESs offering 606 may be displayed both on an overview tab 610 for a given ES and in an ES portfolio structure 616. The ES portfolio structure 616 may, in certain cases, display an ESs offering performance icon 614 based on the ESs offering performance score. The ESs offering performance icon 614 may be color coded based on the ESs offering performance score.

The ESs offering performance score of each ESs offering may be weighted and used to determine the ES performance score. As an example, the corporate email ESs offering 606 has an ESs offering weight 612A of 65%, greater than the ESs offering weight 612B of 35% of the webmail ESs offering 614. In certain cases, the ES configurations may be weighted and then summed together to determine the ES performance score of the ES. In certain cases, this weight may be modified, for example, by a user or administrator. In certain cases, the weights of the ES configurations sum up to a certain value, such as 100, and each ESs offering is multiplied against the associated weight and summed together. Allowing the weight of each ESs offering to be adjusted allows the relative contribution of the ESs offering to the ESs offering performance score to be adjusted. Adjustment here may be desired, for example, as certain metrics may be considered less important based on various factors, such as criticality, number of users, value, etc., of a particular ES configuration. Alternatively, the ES performance score may be an average of the component ESs offering performance scores.

The ES portfolio structure 616 may be used to organize the ESs associated with an ES portfolio. Generally, an ES portfolio may be organized around cost roll-ups, accountability, and ownership responsibilities associated with an enterprise organization. For example, the enterprise organization may have separate ES owners responsible for virtualized resources and non-virtualized resources. A separate ES portfolio may then be defined for each user, where each ES portfolio includes the appropriate ESs for that ES portfolio. These ESs may be organized into the ES portfolio structure 616. In certain cases, templates for structuring an ES portfolio may be provided. These templates may be user adjustable to allow the enterprise organization to tailor the ES portfolio by adding or removing ESs. In certain cases, nodes may be added to help organize the ES portfolio structure 616 by allowing new layers and branches to be created or removed. In this example, nodes for software support 618 and collaboration software 620 have been added. Generally, the ES portfolio structure 616 can be seen as a tree structure with nodes at the root and ES configurations (or ESs without multiple ES configurations) at the leaves of the tree structure. A node performance score may be determined based on the ES performance scores of the ESs under the node. The node performance score may be represented by a node performance icon, such as the node performance icon 622 associated with the software support node 618, that may be color coded based on the node performance score. In certain cases, the node performance score may be an average of the ES performance scores. In other cases, ES performance scores may be weighted. These weights may be adjusted, for example, by a user or administrator. In certain cases, the weights of the ES performance scores sum up to a certain value, such as 100, and each ES performance score is multiplied against the associated weight and summed together. In certain cases, icons or labels may be used to distinguish nodes from ESs and ES configurations. For example, nodes may be represented by a different icon than ESs, which in turn are represented by a different icon than for ES configurations.

In certain cases, the ES portfolio overview UI 600 includes an impact management UI 624. Item information 626 obtained by, for example, the impact management module 504, regarding events from other local applications may be displayed in the impact management UI 624. This information may include information related to the type of item, the expected impact of the event, risk level, notes related to the item, etc. In certain cases, events that are relevant to the displayed ES portfolio may be displayed. Events relevant to ESs of the common local application that are a part of another ES portfolio may be displayed in conjunction with the other ES portfolio.

Figure 7:
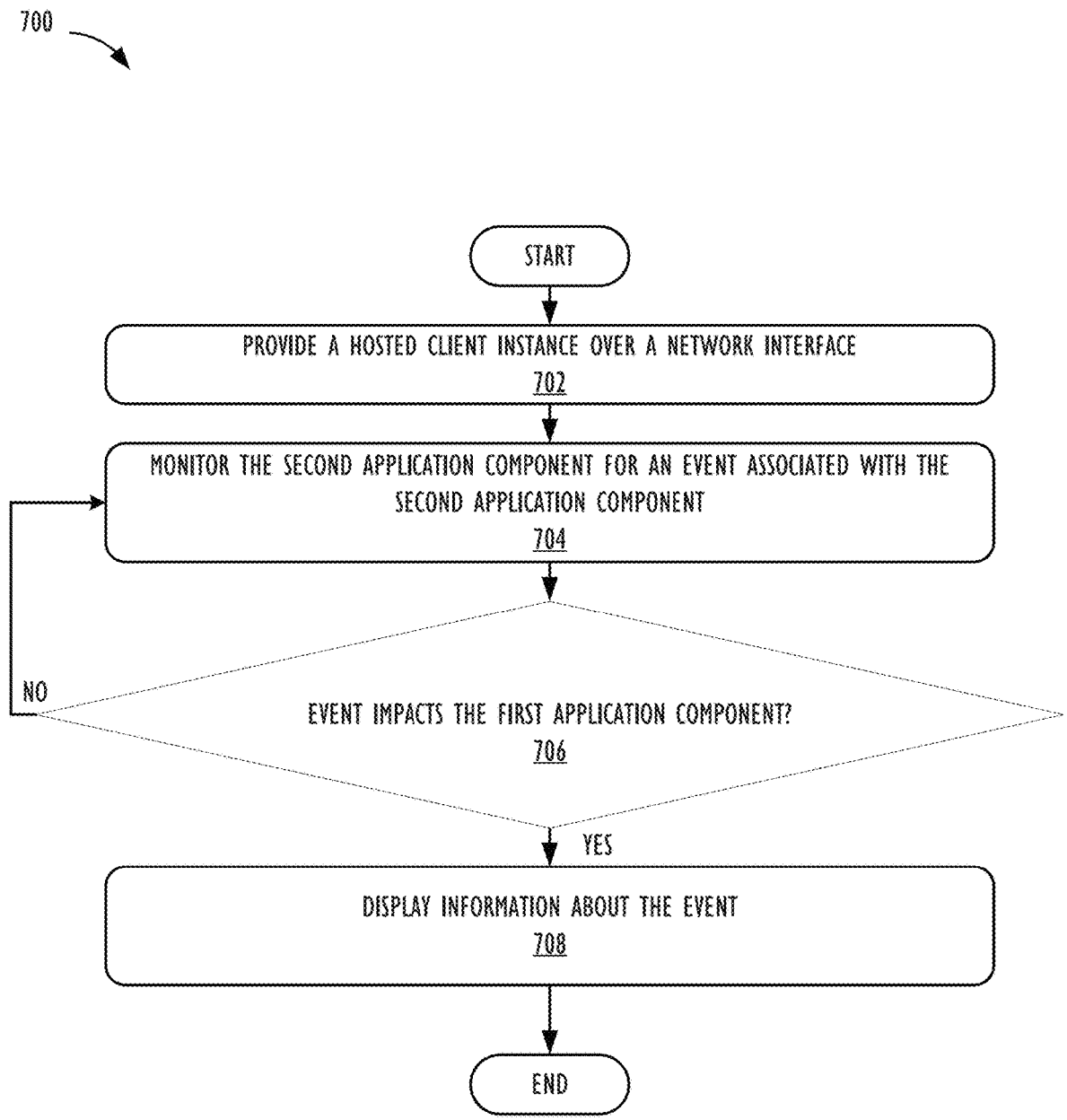
FIG. 7 is a flow diagram 700 illustrating a technique for hosted client management, in accordance with aspects of the present disclosure.

FIG. 7 is a flow diagram 700 illustrating a technique for hosted client management, in accordance with aspects of the present disclosure. At block 702 a hosted client instance is provided over a network interface for communicatively coupling with a remote client device, the hosted client instance including a first application component for performing a first plurality of actions associated with the hosted client instance and a second application component for performing a second plurality of actions. At block 704, the first application component monitors the second application component for an event associated with the second application component. For example, a client instance may include multiple local applications, each local application used to perform a type of work and associated with a related set of functionalities and ESs. As items or events of a second local application can impact a first local application, the first local application may monitor the other local applications for tasks that may impact the first local application. At block 706, a determination is made that the event impacts the first application component based on one or more dependency tables associated with the second application component. For example, items or events are generally associated with certain resources. A CMDB may track these resources and dependencies of these resources. The resources and dependencies for a given item may be identified, for example, from information in the CMDB, and compared to resources and dependencies of the first local application. If the event does not impact the first application, execution continues at block 704. At block 708, a user interface of the first application component displays information related to the event. For example, items determined to impact the first local application may be displayed to a user. Execution may then conclude, or, in certain cases, may proceed to block 802 of FIG. 8.

Figure 8:
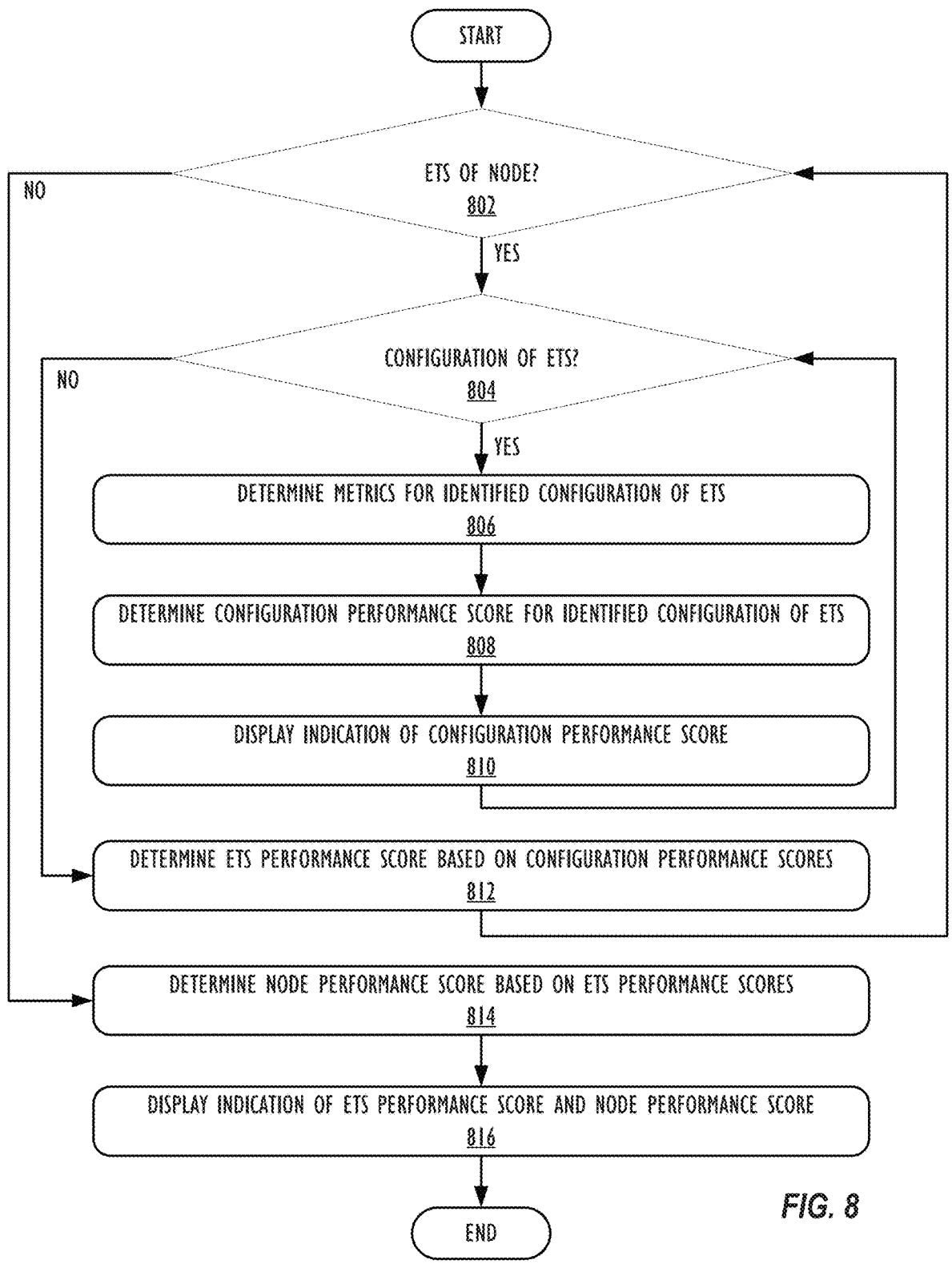
FIG. 8 is a flow diagram 800 illustrating a technique for hosted client management, in accordance with aspects of the present disclosure.

FIG. 8 is a flow diagram illustrating a technique for hosted client management, in accordance with aspects of the present disclosure. As discussed above, ESs of a local application may be grouped into an ES portfolio and a node may be defined for an ES portfolio as including one or more of the ESs in the ES portfolio. At block 802, if a node for an ES portfolio of an application component includes one or more ESs, an ES is identified and execution continues to block 804. At block 804, if the ES includes one or more ES configurations an ESs offering is identified and execution continues to block 806. At block 806, metrics for the ESs offering are determined. For example, one or more metrics related to the health and performance of an ESs offering may be determined based on statistics gathered for the ES configuration. At block 808, a configuration performance score is determined based on the metrics for the configuration of the ES. In certain cases, the metrics may be weighted for use in determining the configuration performance score. At block 810, an indication of the determined configuration performance score is displayed in a UI of the application component. For example, a UI element indicative of the configuration performance score may be displayed in the ES portfolio UI. The UI element may be color-coded based on the configuration performance score. The performance score may also be displayed in the UI of the application component. If there are additional ES configurations, then execution proceeds via block 804 to block 806. Otherwise if there are no additional configurations of the ES, execution proceeds via block 804 to block 812. At block 812, an ES performance score is determined based on the configuration performance scores for the one or more ES configurations. In certain cases, the one or more configuration performance scores may be weighted for determining the ES performance score. If there are additional ESs for the node, execution continues at block 802 via block 802. Otherwise, if there are no additional ESs for the node, execution continues at block 814 via block 802. At block 814, a node performance score is determined based on the ES performance scores for the one or more ESs. In certain cases, the ES performance scores may be weighted for determining the node performance score. At block 816, an indication of the ES performance score and an indication of the node performance score are displayed for the respective ESs and the node. For example, a color-coded UI element, similar to the UI element displayed for the configuration performance scores for the may be displayed for the ES performance scores and node performance scores. If there are additional nodes, blocks 802-816 may be repeated for the additional nodes.

Figure 9:
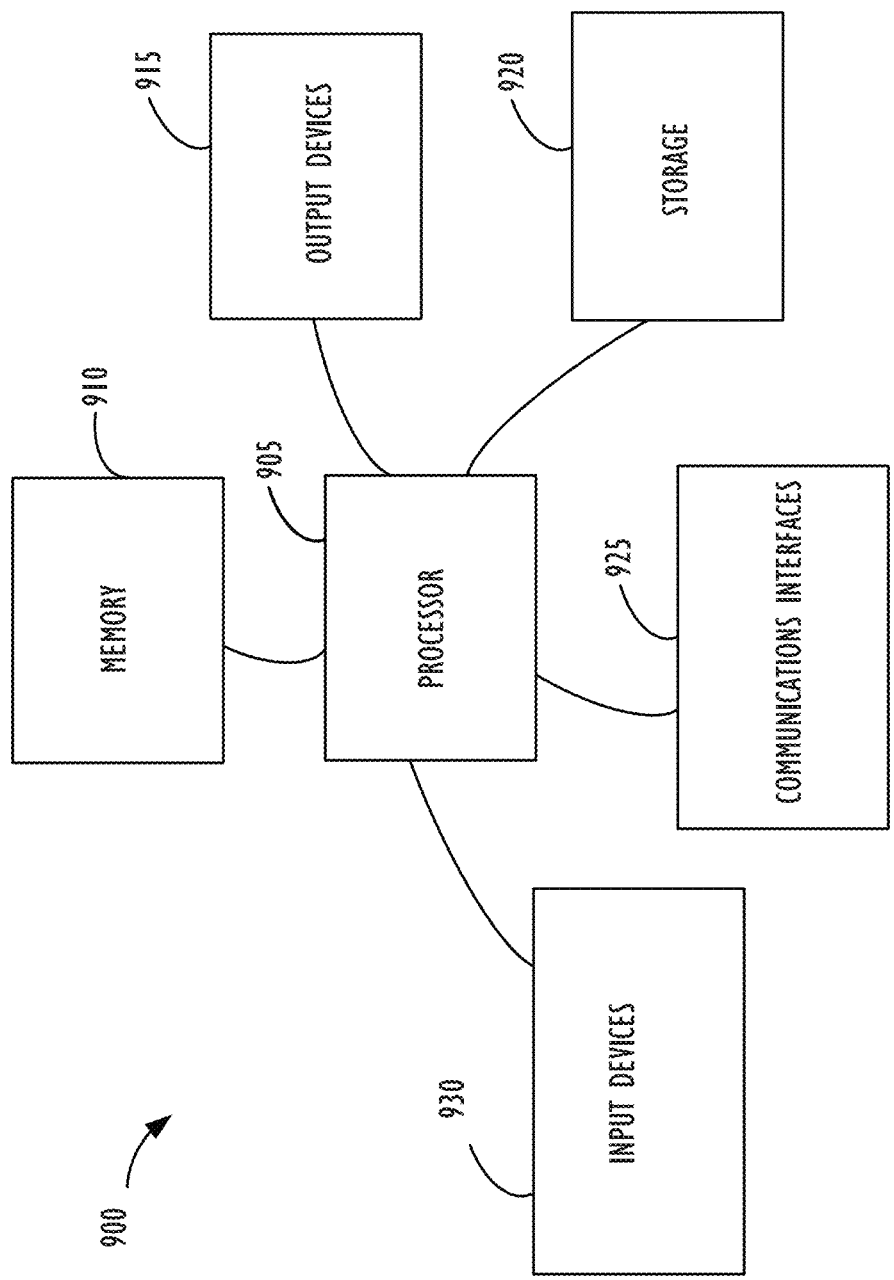
FIG. 9 illustrates a high-level block diagram of a processing device (computing system) 900 that may be used to implement one or more disclosed embodiments.

FIG. 9 illustrates a high-level block diagram of a processing device (computing system) that may be used to implement one or more disclosed embodiments (e.g., data server computers 110, client computers 115, cloud resources platform/network 210, client devices 204A-204E, client instance 308, server instances 214, data centers 306A-306B, remote client device 402, etc.). For example, computing device 900 illustrated in FIG. 9 could represent a client device or a physical server device and include either hardware or virtual processor(s) depending on the level of abstraction of the computing device. In some examples (without abstraction) computing device 900 and its elements as shown in FIG. 9 each relate to physical hardware and in some examples one, more, or all of the elements could be implemented using emulators or virtual machines as levels of abstraction. In any case, no matter how many levels of abstraction away from the physical hardware, computing device 900 at its lowest level may be implemented on physical hardware. As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display). Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 9, processing device 900 includes a processing element such as processor 905 that contains one or more hardware processors, where each hardware processor may have a single or multiple processor cores. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory medium configured to store various types of data. For example, memory 910 may include one or more volatile devices such as random access memory (RAM). Non-volatile storage devices 920 can include one or more disk drives, optical drives, solid-state drives (SSDs), tap drives, flash memory, read only memory (ROM), and/or any other type memory designed to maintain data for a duration time after a power loss or shut down operation. In certain embodiments, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 900 may comprise other components well known in the art, such as sensors, powers sources, and/or analog-to-digital converters, not explicitly shown in FIG. 9.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory computer readable medium comprising computer readable code executable by one or more processors to:
provide a hosted client instance over a network interface for communicatively coupling with a remote client device, the hosted client instance including a first application component for performing a first plurality of actions associated with the hosted client instance and a second application component for performing a second plurality of actions, wherein the first application component comprises one or more enterprise services;
monitor, by the first application component, the second application component for an event associated with the second application component;
determine that the event impacts at least one enterprise service (ES) of the one or more enterprise services of the first application component based on one or more dependency tables associated with the second application component; and display, in a user interface of the first application component, information related to the event.

2. The computer readable medium of claim 1, wherein each application component comprises a separate set of offered enterprise services.

3. The computer readable medium of claim 1, wherein the computer readable code is further executable by one or more processors to:

identify a first configuration of an ES of the one or more enterprise services for the first application component;

determine two or more metrics for the first configuration of the ES;

determine a first configuration performance score for the first configuration of the ES based on the two or more metrics; and display, in the user interface of the first application component, an indication of the determined first configuration performance score.

4. The computer readable medium of claim 1, wherein the computer readable code is executable by one or more processors to:

determine an indication of performance of the at least one ES; and display, in the user interface of the first application component, the indication of performance.

5. The computer readable medium of claim 1, wherein the at least one ES comprises two or more configurations, wherein determining that the event impacts the at least one ES comprises determining that the event impacts at least one configuration of the two or more configurations of the at least one ES.

6. The computer readable medium of claim 2, wherein the determination is based on one or more dependencies maintained by a third application component.

7. The computer readable medium of claim 3, wherein the computer readable code is further executable by one or more processors to:

determine a second configuration performance score for a second configuration of the ES;

determine an ES performance score for the ES based on the first configuration performance score and the second configuration performance score; and display, in the user interface, an indication of the determined ES performance score.

8. The computer readable medium of claim 7, wherein the computer readable code is further executable by one or more processors to:

determine a node performance score based on the ES performance score for the ES and another ES performance score for another ES; and display, in the user interface, an indication of the determined node performance score.

9. The computer readable medium of claim 7, wherein each configuration performance score is associated with a weight and wherein the ES performance score is further determined based on the weight associated with each configuration performance score.

10. The computer readable medium of claim 9, wherein the weight is user adjustable.

11. A system comprising:

one or more processors; and one or more computer readable storage medium comprising computer readable code executable by the one or more processors to:

provide a hosted client instance over a network interface for communicatively coupling with a remote client device, the hosted client instance including a first application component for performing a first plurality of actions associated with the hosted client instance and a second application component for performing a second plurality of actions, wherein the first application component comprises one or more enterprise services;

monitor, by the first application component, the second application component for an event associated with the second application component;

determine that the event impacts at least one enterprise service (ES) of the one or more enterprise services of the first application component based on one or more dependency tables associated with the second application component; and display, in a user interface of the first application component, information related to the event.

12. The system of claim 11, wherein the determination is based on one or more dependencies maintained by a configuration management database of the client instance.

13. The system of claim 11, wherein the computer readable code is further executable by the one or more processors to:

identify a first configuration of an ES of the one or more enterprise services for the first application component;

determine two or more metrics for the first configuration of the ES;

determine a first configuration performance score for the first configuration of the ES based on the two or more metrics; and display, in the user interface of the first application component, an indication of the determined first configuration performance score.

14. The system of claim 13, wherein the computer readable code is further executable by one or more processors to:

determine a second configuration performance score for a second configuration of the ES;

determine an ES performance score for the ES based on the first configuration performance score and the second configuration performance score; and display, in the user interface, an indication of the determined ES performance score.

15. The system of claim 14, wherein the computer readable code is further executable by one or more processors to:

determine a node performance score based on the ES performance score for the ES and another ES performance score for another ES; and display, in the user interface, an indication of the determined node performance score.

16. The system of claim 14, wherein each configuration performance score is associated with a weight and wherein the ES performance score is further determined based on the weight associated with each configuration performance score.

17. The system of claim 16, wherein the weight is user adjustable.

18. A method for hosted client management, the method comprising:

providing a hosted client instance over a network interface for communicatively coupling with a remote client device, the hosted client instance including a first application component for performing a first plurality of actions associated with the hosted client instance and a second application component for performing a second plurality of actions, wherein the first application component comprises one or more enterprise services;

monitoring, by the first application component, the second application component for an event associated with the second application component;

determining that the event impacts at least one enterprise service (ES) of the one or more enterprise services of the first application component based on one or more dependency tables associated with the second application component; and displaying, in a user interface of the first application component, information related to the event.

19. The method of claim 18, wherein each application component comprises a separate set of offered enterprise services.

20. The method of claim 18, further comprising:

identifying a first configuration of an ES of the one or more enterprise services for the first application component;

determining two or more metrics for the first configuration of the ES; on one or more metrics;

determining a second configuration performance score for a second configuration of the ES based on the one or more metrics;

determining an ES performance score for the ES based on the first configuration performance score and the second configuration performance score; and displaying, in the user interface of the first application component, an indication of the determined ES performance score.

* * * * *

UNITED STATES PATENT AND TRADEMARK OFFICE
CERTIFICATE OF CORRECTION

| | | |
|---|---|---|
| PATENT NO. | : 11,188,349 B2 | Page 1 of 1 |
| APPLICATION NO. | : 16/402817 | |
| DATED | : November 30, 2021 | |
| INVENTOR(S) | : Thigpen et al. | |

It is certified that error appears in the above-identified patent and that said Letters Patent is hereby corrected as shown below:

In the Claims

Column 19, Lines 20-21, Claim 20, please delete "determining two or more metrics for the first configuration of the ES;" and replace with --determining a first configuration performance score for the configuration of the ES based--.

Column 19, Line 21, Claim 20, please insert --the-- between "on" and "one".

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*